Jan. 28, 1930.
O. E. HORNER
1,745,217
CONVERTIBLE AUTOMOBILE BODY
Filed Dec. 2, 1927
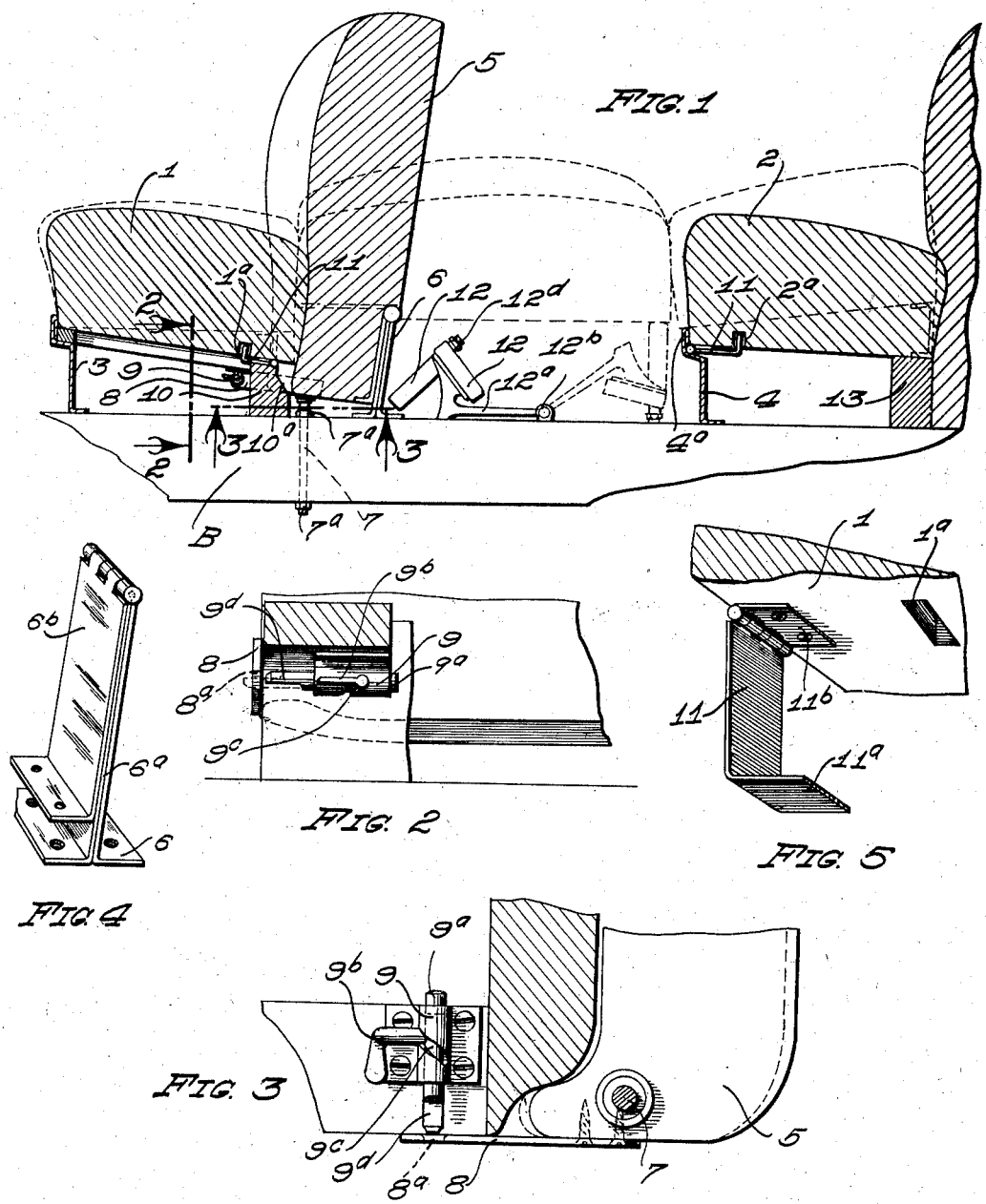
INVENTOR.
OLIVER E. HORNER
BY A. B. Bowman
ATTORNEY Patented Jan. 28, 1930

1,745,217

UNITED STATES PATENT OFFICE

OLIVER E. HORNER, OF SAN DIEGO, CALIFORNIA

CONVERTIBLE AUTOMOBILE BODY

Application filed December 2, 1927. Serial No. 237,171.

My invention relates to a convertible automobile bed and the objects of my invention are: first, to provide a structure of this class whereby the interior of an automobile body provided with seats may be readily and easily converted into a comfortable bed of the full width of the interior of the automobile body; second, to provide a back for the front seat of an automobile which is upholstered at its front side at such a height from its lower to its upper end as to span and to be supported in the space between the rear side of the front seat and the front side of the rear seat of the automobile, the seat member being supported in such a manner as to permit it to be readily rotated from its vertical position to the horizontal position without further adjustment thereof; third, to provide a hinge for suitably supporting the back member of an automobile seat which is adapted to fit flush with the rear surface of said back member when said back member is in its vertical position and which requires no useful space in its assembly in the automobile and which is further a simple, economical, and rigid device; fourth, to provide a novel means in connection with a conventional foot rest secured to the floor of the vehicle at the rear of the front seat for supporting the upper portion of the horizontally positioned back member in front of the back seat of the automobile; fifth, to provide as a whole a novelly constructed convertible automobile body for converting the seats thereof into a bed; and sixth to provide a structure of this class which is simple and economical of construction, durable and which will not readily deteriorate or get out of order.

With these and other objects in view as will appear hereinafter my invention consists of certain novel features of construction, combination and arrangement of parts and portions as will be hereinafter described in detail and particularly set forth in the appended claims, reference being had to the accompanying drawings and to the characters of reference thereon which form a part of this application, in which:

Figure 1 is a longitudinal sectional elevational view taken through the interior of the body of an automobile, illustrating my invention in connection with the back of a front seat thereof showing by dotted lines certain shifted position of the back member; Fig. 2 is a fragmentary sectional elevational view taken through 2—2 of Fig. 1 showing the novel locking means for holding the back member in the vertical position; Fig. 3 is an enlarged fragmentary plan view thereof in section taken along the lines 3—3 of Fig. 1; Fig. 4 is a perspective elevational view of the special hinge member used for pivotally mounting the back member; Fig. 5 is a perspective elevational view of a collapsible supporting member provided for raising the seat to the level of the back member when in a horizontal position.

Similar characters of reference refer to similar parts and portions throughout the several views of the drawings.

The front and rear seat members 1 and 2 have the conventional upholstered construction and are supported on their front lower edges in the conventional automobile seat supporting frames 3 and 4 which normally form a part of the automobile body B. In place of the conventional back member which is usually supported on the conventional seat supporting frame 3 and built into the side walls of the vehicle body B behind the front seat of the automobile, I have provided a pivoted back member 5, which when in position for supporting the back of a person resembles very closely the conventional back construction. It will be noted however that this member extends considerably below the top of the front seat 1 and is upholstered over its entire length. The length of the back member 5 is substantially equal to the spacing of the front and rear seats 1 and 2 especially such that when placed in a horizontal position it completely fills the space. The back member 5 is pivotally supported on hinge members 6 secured to the lower rear end of the seat member in such a manner that the top of the seat member 5 may be rotated into a position adjacent the front portion of the rear seat 2 as indicated by dotted lines in Fig. 1. The construction of the novel hinge 6 is clearly illustrated in Fig. 4. This hinge includes a supporting portion 6ª formed preferably of a rigid metal strap bent double, the loop end forming the hinge eye and the free ends of the strap being bent substantially at right angles in opposite directions to form a suitable base for the supporting portion 6ª. A somewhat shorter hinge portion 6ᵇ is hinged to the upper end of the upright portion 6ª, said portion 6ᵇ being bent at its outer end at right angles outwardly in respect to the portion 6ª and is adapted to be screwed to or otherwise secured to the lower end of the back rest 5. The member 6 is secured to the body of the automobile in such a position that the member 5 will assume a position substantially level with the seats 1 and 2 when rotated into the horizontal position. A stop member 7 is provided for supporting the lower front edge of the back member 5 when in the vertical position and limits the forward movement thereof. This stop member is preferably in the form of an adjustable bolt, having nuts 7ª and operates in conjunction with a locking bar 8, one of which is provided at and secured to either end of the seat member and extends forwardly thereon and is normally positioned underneath the front seat 1. An aperture 8ª is provided at the outer end of the member 8 and an eccentric bolt means 9 is secured to the under surface of the end frame work of the seat 1 in such a position that the bolt member 9ª may be slid into the opening 8ª thereby locking the back member to the seat member 1. In order to obtain a certain amount of tension on the member 8 and in order to prevent rattling of the lock an inclined slot 9ᶜ is provided, forming a cam, in which the bolt handle 9ᵇ may be rotated, causing the eccentric portion 9ᵈ of the bolt to exert a pressure on the member 8 when in the closed position as is illustrated in Figs. 2 and 3, in which the dotted line indicates the closed position of the locking means 9. The stop member 7 may then be adjusted so as to take a large percentage of the seat weight, this adjustment being made by means of the bolt nut 7ª. The rear of the seat member 1 is supported on a suitable block or other supporting means 10 preferably extending the length of the seat. Said supporting member 10 is preferably beveled as at 10ª in order to allow the lower front corner of the seat member 5 to pass clear of the block member 10 when said body member is rotated into the horizontal position. A hinge member 11 is pivotally secured to the ends of the frame of the seat 1 directly above the support 10 in such a manner that the seat member 1 may be raised to a substantially horizontal position as indicated in dotted lines in Fig. 1. Said supporting member 11 includes the hinge portion 11ᵇ secured to the seat member 1 and a support portion 11ª the lower end of which is bent at right angles to form a broad base for carrying the weight of the seat 1 when the latter is raised to a horizontal position. When in the normal seating position of the seat member 1 the support 11 is folded upwardly against the lower surface of the frame of the seat member 1 and the base portion 11ª is received in a slot 1ª provided in the frame of the seat member 1, thereby permitting the member 11 to fold against the lower surface of the seat frame. An identical supporting member is provided at the front end of the rear seat 2. A suitable slot 2ª is provided in a frame of said seat in order to accommodate the base member 11ª of the support 11 when folded against the frame of the seat 2.

Rearwardly of the back member 5, I place a foot rest 12, which is preferably pivotally secured to the body of the automobile for which purpose I provide arms 12ª extending forwardly of the foot rest 12 and hinged to the floor of the automobile by hinge means 12ᵇ secured at a point intermediate of the foot rest 12 and the rear seat support 4. The foot rest 12 is provided with a pair of rearwardly extending support members 12ᶜ, forming preferably an integral part of the foot rest 12 and normally occupying a position intermediate the rear of the seat back member 5 and the foot rest 12. When it is intended to rotate the back member 5 into a horizontal position, the foot rest 12 is rotated backwardly approximately 180 degrees, so that the support members 12ᶜ occupy a substantially upright position. These members thus serve as supports for the upper rear end of the back member 5 when the latter is in the horizontal position. In order to provide for adjustment of the elevation of the back member 5 when in the horizontal position and supported on the member 12ᶜ I provide an adjustable stop member 12ᵈ on the face of the foot rest 12 whereby a slight adjustment of the height may be made.

In preparing the seats in the form of a bed, I first rotate the foot rest to the rearward position, I then raise the front seat sufficiently to allow the back member 5 to be rotated backwardly on the hinge member 6, said back rest being first released by withdrawing the bolt 9. The upper and lower rear ends of the body member is thus supported in a horizontal position by the supports 12ᶜ and 6ª. The support member 11ª underneath the front seat is then swung downwardly and the front seat allowed to rest thereon. The rear seat is reversed, the member 11 on this seat also being swung into the vertical position and the normally front end of the seat 2 is supported in raised position on the block 13. The bed then assumes the form indicated in dotted lines in Fig. 1. It will be noted that the front seat 1 and back member 5 form a substantially level bed while the rear seat 2 is upwardly inclined, forming a comfortable head rest.

Though I have shown and described a particular construction, combination and arrangement of parts and portions I do not wish to be limited to this particular construction, combination and arrangement but desire to include in the scope of my invention, the construction, combination and arrangement substantially as set forth in the appended claims.

Having thus described my invention what I claim as new and desire to secure by Letters Patent is:

1. In a convertible automobile body structure, front and rear rearwardly sloping seat members, an upholstered back member associated with said front seat member, laterally flat upright support and hinge members rigidly secured to the floor of the automobile and pivotally connected to the rear of the back member, said back member being recessed contiguous with said upright members and adapted to receive said upright members in embedded relation, said back member adapted to assume a horizontal position intermediate the front and rear seats, means for raising the front seat member to a substantially horizontal position, and means in connection with said rear seat member whereby the latter may assume a rearwardly upwardly inclined position.

2. In a convertible automobile body structure, front and rear seat members, front and rear seat cushions, an upholstered back member supported with said front seat member, means for supporting said back member and permitting said back member to be rotated backwardly to a substantially horizontal position, a transversely extending member for supporting the rear of said rear cushion, supporting hinge means mounted on the lower rear side portion of said front seat cushion for elevating said cushion to a position substantially horizontal and flush with said back member when said back member is in its horizontal position, other supporting hinge means secured to the lower front edge of said rear seat cushion, said rear cushion adapted to be placed front to back and raised to a forwardly inclined position by said hinge means resting on said cushion supporting member.

In testimony whereof, I have hereunto set my hand at San Diego, California, this 25th day of November, 1927.

OLIVER E. HORNER.